(12) United States Patent
Vitol

(10) Patent No.: US 10,845,309 B2
(45) Date of Patent: Nov. 24, 2020

(54) BLACKENED OPTICAL COMPONENT WITHOUT FLUORESCENCE

(71) Applicant: Ecolab USA Inc., Saint Paul, MN (US)

(72) Inventor: Elina A. Vitol, Lombard, IL (US)

(73) Assignee: Ecolab USA Inc., Saint Paul, MN (US)

( * ) Notice: Subject to any disclaimer, the term of this patent is extended or adjusted under 35 U.S.C. 154(b) by 153 days.

(21) Appl. No.: 16/227,660

(22) Filed: Dec. 20, 2018

(65) Prior Publication Data

US 2019/0195794 A1 Jun. 27, 2019

Related U.S. Application Data

(60) Provisional application No. 62/608,953, filed on Dec. 21, 2017.

(51) Int. Cl.
| | | |
|---|---|---|
| *G01N 21/64* | (2006.01) | |
| *B05D 3/00* | (2006.01) | |
| *B05D 5/06* | (2006.01) | |
| *C23C 22/83* | (2006.01) | |
| *C23G 1/12* | (2006.01) | |
| *C23C 22/56* | (2006.01) | |

(52) U.S. Cl.
CPC ........... *G01N 21/645* (2013.01); *B05D 3/007* (2013.01); *B05D 5/065* (2013.01); *C23C 22/56* (2013.01); *C23C 22/83* (2013.01); *C23G 1/125* (2013.01); *G01N 2021/6463* (2013.01)

(58) Field of Classification Search
CPC .......... G01N 21/645; G01N 2021/6463; C23C 22/83; C23G 1/125; B05D 3/007; B05D 5/065

See application file for complete search history.

(56) References Cited

U.S. PATENT DOCUMENTS

| | | |
|---|---|---|
| 3,172,786 A | 3/1965 | Kirby, Jr. et al. |
| 3,382,160 A | 5/1968 | Asada |
| 3,677,827 A | 7/1972 | Weaver et al. |
| 4,111,762 A | 9/1978 | Wade et al. |

(Continued)

FOREIGN PATENT DOCUMENTS

| | | |
|---|---|---|
| JP | 2014071083 A | 4/2014 |
| WO | 2008024080 A1 | 2/2008 |
| WO | 2016141323 A1 | 9/2016 |

OTHER PUBLICATIONS

Sharma et al., "Anodizing and Inorganic Black Coloring of Aluminum Alloys for Space Applications," Metal Finishing, Dec. 1997, pp. 14-20.

(Continued)

*Primary Examiner* — Michael C Bryant
(74) *Attorney, Agent, or Firm* — Fredrikson & Byron, P.A.

(57) ABSTRACT

An optical component may be optically blackened so that the surface of the component is not reflective when light impinges upon the surface. In some examples, a method of blackening involves exposing a surface of the optical component that defines an optical pathway to an optical blackening composition for a period of time effective to optically blacken the surface. The optical blackening composition may be configured so that the resulting optically blackened optical pathway is non-fluorescing when exposed to ultraviolet light. In some examples, the optical blackening composition comprises selenous acid and is devoid of organic molecules.

23 Claims, 7 Drawing Sheets

(56) References Cited

U.S. PATENT DOCUMENTS

| | | | |
|---|---|---|---|
| 4,180,443 | A | 12/1979 | Darrow |
| 4,511,614 | A | 4/1985 | Greeson et al. |
| 4,589,972 | A | 5/1986 | Pompea et al. |
| 4,624,709 | A | 11/1986 | Otsuka |
| 4,657,786 | A | 4/1987 | Sirinyan et al. |
| 5,102,508 | A | 4/1992 | Bartkowski et al. |
| 5,308,737 | A | 5/1994 | Bills et al. |
| 5,820,740 | A | 10/1998 | Le et al. |
| 7,115,232 | B2 | 10/2006 | Hudson |
| 7,989,780 | B2 | 8/2011 | Takhtuev et al. |
| 8,512,872 | B2 | 8/2013 | Cabot et al. |
| 9,618,450 | B2 | 4/2017 | Banks et al. |
| 2004/0222105 | A1 | 11/2004 | Heimann et al. |
| 2009/0002820 | A1* | 1/2009 | Okano ............... G02B 5/3025 359/483.01 |
| 2013/0081952 | A1 | 4/2013 | Akimoto et al. |

OTHER PUBLICATIONS

Insta Blak A-384 Material Safety Data Sheet, Electrochemical Products Inc., Revision 1.0000, Mar. 19, 2013, 13 pages.

Insta-Blak A-385 Technical Data, Room Temperature Blackening Solution for Aluminum, Electrochemical Products Inc., Feb. 17, 2014, 4 pages.

Insta-Blak A-380 Material Safety Data Sheet, Electrochemical Products Inc., Dec. 15, 2009, 2 pages.

Insta Blak A-385 Material Safety Data Sheet, Electrochemical Products Inc., Revision 1.0000, May 16, 2012, 5 pages.

E-Kleen 154 Material Safety Data Sheet, Electrochemical Products Inc., Revision 1.0000, Nov. 20, 2013, 11 pages.

International Patent Application No. PCT/US2018/066786, International Search Report and Written Opinion dated Mar. 14, 2019, 13 pages.

Insta Blak A-385 Safety Data Sheet, Electrochemical Products Inc., Revision 1.1, Mar. 27, 2015, 12 pages.

* cited by examiner

BLACKENED OPTICAL COMPONENT WITHOUT FLUORESCENCE

RELATED MATTERS

This application claims priority to U.S. Patent Application No. 62/608,953, filed Dec. 21, 2017, the entire contents of which are incorporated herein by reference.

TECHNICAL FIELD

This disclosure relates to optical measuring devices and, more particularly, to an optical component suitable for use in a fluorometer.

BACKGROUND

In cleaning and antimicrobial operations, commercial users (e.g., restaurants, hotels, food and beverage plants, grocery stores, etc.) rely upon the concentration of a cleaning or antimicrobial product to make the product work effectively. Failure of a cleaning or antimicrobial product to work effectively (for example due to concentration issues) can cause a commercial user to perceive the product as lower quality. End consumers may also perceive the commercial provider of such products as providing inferior services. In addition, commercial users may be investigated and/or sanctioned by government regulatory and health agencies. Accordingly, there is a need for a system that can monitor the characteristics of fluid solutions, e.g., to determine if the concentration of a product is within a specified concentration range. The same may be true for other applications, such as water care, pest control, beverage and bottling operations, oil and gas refining and processing operations, and the like.

One method of monitoring the concentration of a product relies on monitoring the fluorescence of the product that occurs when the sample (and the product within the sample) is exposed to a predetermined wavelength of light. For example, compounds within the product or a fluorescent tracer added to the product may fluoresce when exposed to certain wavelengths of light. The concentration of the product can then be determined using a fluorometer that measures the fluorescence of the compounds and calculates the concentration of the chemical based on the measured fluorescence.

In applications where the concentration of fluorescing compounds in the sample being analyzed is low, signal interference caused by the sample itself or the instrument analyzing the sample can lead to measurement errors and inconsistencies. For example, if the signal from the sample being analyzed is weak, background fluorescence from interfering sources may be stronger than the signal of the sample, making it difficult to determine the concentration of the sample.

SUMMARY

In general, the present disclosure is directed to techniques for optically blackening a component of an optical sensor, and optical components so blackened, with the resulting optically blackened components being substantially or entirely non-fluorescing. In the process of constructing an optical sensor housing or other optical component that may be exposed to light during optical measurements, the surfaces of the optical component may be treated to be optically blackened or formed of an optically blacked material. The optically blackened surface may absorb stray light within the optical sensor during operation, helping to suppress signal noise and improving the performance of the optical sensor.

In a fluorometric optical sensor, light is directed into a sample under investigation at an emission spectrum and a fluorometric response from the sample is detected within an excitation spectrum. A fluorometric optical sensor may detect a fluorometric response orders of magnitude below what can be detected with simple absorbance measurements. This can provide high sensitivity for detecting low quantities of an analyte of interest in a sample.

In practice, it has been observed that optical blackening coatings and optically blacked materials typically used in optical sensors may contain components or molecules that fluoresce when exposed to an emission spectrum. The amount of fluorescence emitted by these auto-fluorescing materials may be low compared to the amount of fluoresce emitted by a sample under investigation. However, as optical sensor designers seek to detect ever lower levels of fluorescing molecules with improved accuracy and predictability, the fluorescence of the optically blackened surfaces of the sensor provides a source of error that limits sensor performance. The fluorescence emitted by the optically blackened surfaces of the sensor can interfere with the fluorescence signal from the sample under investigation, limiting the detection capabilities of the sensor.

According to some examples of the present disclosure, methods for optically blackening optical components are described that result in a non-fluorescing optically blackened pathway. For example, an optical component may be exposed to an optical blackening composition comprising seleneous acid for a period of time effective to optically blacken the surface and provide a non-fluorescing, optically-blackened surface. In some examples, the optical blacking composition also includes a transition metal that reacts with the seleneous acid to form a metal selenide coating. Example transition metals that may be included in the optical blackening composition include, but are not limited to, nickel, zinc, and copper. In either case, treatment with the optical blacking composition can produce an optical component with a surface exposed to an emission spectrum during operation that is optically blackened and non-fluorescing.

In one example, method of blackening an optical component is described. The method includes exposing a surface of an optical component that defines an optical pathway to an optical blackening composition that comprises selenous acid for a period of time effective to optically blacken the surface and yield an optically blackened optical pathway that is non-fluorescing. The method further includes removing residual optical blackening composition from the surface of the optical component and drying the optical component.

In another example, an optical component is described. The optical component includes a surface formed of metal that defines an optical pathway configured to receive light from a fluid sample under analysis through an optical lens. The example specifies that the surface is optically blackened with a metal selenide and does not emit fluorescent emissions in response to being exposed to ultraviolet light.

In another example, an optical sensor is described that includes a housing, an optical emitter, and an optical detector. The housing has an optical pathway that directs light through an optical window optically connected to the optical pathway into a fluid sample under analysis and receives light from the fluid sample through the optical window. The optical emitter is positioned to emit light into the optical pathway. The optical detector is positioned to receive light from the optical pathway. The housing is formed of metal and a surface of the housing defining the optical pathway is optically blackened with a metal selenide. The example specifies that the surface of the housing emits weaker fluorescent radiation than fluorescent radiation emitted by the fluid sample under analysis in response to exposure to ultraviolet light.

The details of one or more examples are set forth in the accompanying drawings and the description below. Other features, objects, and advantages will be apparent from the description and drawings, and from the claims.

DETAILED DESCRIPTION

Figure 1:
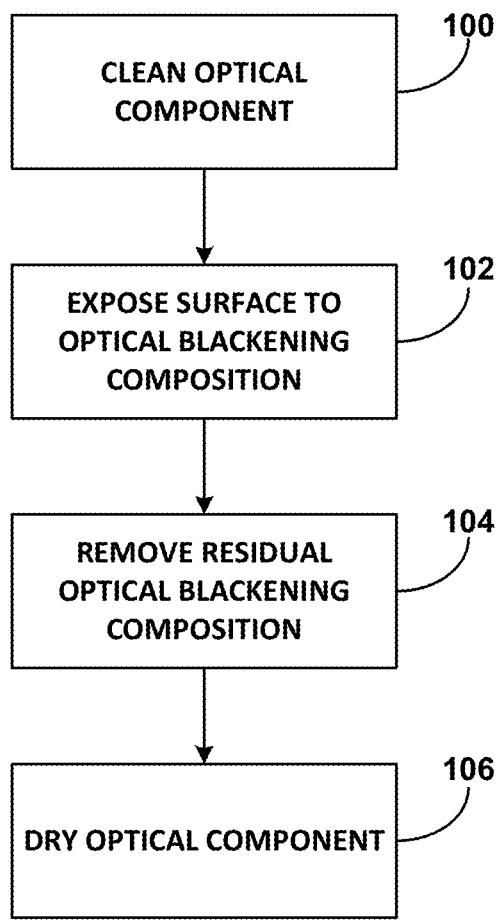
FIG. 1 is a flow diagram illustrating an example process for blackening an optical component.

In general, this disclosure relates to optically blackened optical components and techniques for optically blackening optical components. The term optical component generally refers to a physical element that constitutes part of a larger optical sensor assembly (e.g., located inside of or forming part an optical sensor housing) and which light impinges upon during operation of the optical sensor assembly. For example, the optical component may define a surface that light emitted into a sample under analysis shines upon as it travels from an optical emitter to a sample and/or surface that light received from a sample under analysis shines upon as it travels form the sample to an optical detector. In some examples as discussed in greater detail below, the optical component is or defines an optical pathway extending between an optical detector and lens configured to be positioned in contact with a sample under analysis.

Independent of the specific configuration of the optical component, the optical component may be optically blackened according to example techniques of the disclosure. The resulting optically blackened optical component may be non-fluorescing such that light impinging upon the surface of the optically blackened component does cause fluorescent emission by the surface. In some examples, the optical component is exposed to optical blackening composition that includes seleneous acid. For example, the optical blackening composition may include seleneous acid and a transition metal selected to form a metal selenide coating on the surface of the component. The transition metal may be one or more elements from Groups 3 through 12 of the periodic table, including combinations thereof. The resulting metal selenide coating may be substantially or entirely non-fluorescing, e.g., when exposed to light within the visible spectrum. For example, when implemented in a fluorometric sensor system, the strength of the fluorometric emissions from the optically blackened surface of the optical component may be less than the strength of the fluorometric emissions from the sample under analysis, such at least an order of magnitude less, at least two orders of magnitude less, at least five orders of magnitude less, or at least ten orders of magnitude less than the strength of the fluorometric emissions from the sample.

It has been observed that optical components treated with conventional blackening compositions can unexpectedly exhibit fluorescent emissions that interfere with the fluorescent response emitted from a sample under analysis. Light emitted through the optical sensor at an excitation wavelength can cause fluorescent emissions to emit at an excitation wavelength from the sample under analysis as well as surfaces of the optical sensor containing a conventional blackening composition. These fluorescent emissions from one or more optical components of the optical sensor itself can interfere with the fluorescence signal received from the sample, particularly when the sample contains a comparatively low level of fluorescing molecules.

While interference from a coating on an optical sensor component can impact operation of any optical sensor configuration, interference may be more impactful for optical sensor configurations that emit and detect light through a shared optical pathway (e.g., optically connected to a single lens in contact with a fluid sample under analysis). For pass through optical sensor configurations having an emitter and detector on opposite sides of the fluid sample under analysis, fluorescent emissions from a surface of an optical component on the emitter side of the sensor may be attenuated before reaching the detector side of the sensor. By contrast, for an optical sensor having an optical emitter and detector that send and receive light through a common optical pathway, fluorescent emissions caused by light from the optical emitter impinging upon the optical pathway may be detected by the optical detector without attenuating to the same extent as in a pass through configuration. Accordingly, optical blackening techniques and optically blackened components according to the disclosure may be especially useful for an optical sensor configured to emit light into a fluid sample and receive light from the fluid sample through common (e.g., single) lens and shared optical pathway. That being said, the techniques and components can find applicability to a wide range of different optical sensor configurations and the disclosure is not limited in this respect.

FIG. 1 is a flow diagram illustrating an example process for blackening an optical component. The technique includes cleaning the optical component in preparation for optical blackening (100) and exposing a surface of the optical component to it optical blackening composition (102). After exposing the surface of the optical component to the optical blackening composition, residual optical blackening composition is removed from the component (104) and the optical component is dried (106). As described in greater detail below, a variety of different optical blackening composition components and processing conditions can be used to create and optically blackened optical component utilizing the example process of FIG. 1.

As mentioned above, an optical component may be physical element that constitutes part of a larger optical sensor assembly (e.g., located inside of or forming part an optical sensor housing) and which light impinges upon during operation of the optical sensor assembly. In some examples, the optical component that is optically blackened is fabricated of metal. For example, the optical component may be fabricated from aluminum, stainless steel, or other optically compatible metal.

To prepare an optical component to be optically blackened, the optical component may be optionally cleaned before being exposed to an optical blackening composition (102). Cleaning may remove oil, dirt, debris, or other surface contamination that may otherwise inhibit reaction between the surface of the component and the optical blackening composition. Any suitable cleaning techniques can be used to prepare the optical component for subsequent processing, such as mechanical cleaning of the surface of the optical component and/or chemical cleaning of the surface of the component. The optical component may be immersed in or rinsed with a cleaning liquid, such as an aqueous liquid (e.g., liquid water, steam) or an organic solvent, to clean the surface of the component and prepared for further processing.

In some examples, the optical component is cleaned prior to being exposed to an optical blackening composition by immersing the optical component in an acidic solution. The strength of the acid solution may vary depending on the types of contaminants expected to be present on the surface of the optical component. For example the acidic solution may be a comparatively weak organic acid or a comparatively stronger mineral acid. When used, the concentration of the acid may range from one volume percent to 10 volume percent, such as from 3 volume percent to 7 volume percent. In one example, a phosphoric acid solution is used to clean the optical component. The optical component may be immersed in the acid solution for a period of at least 30 seconds, such as a period ranging from 1 minute to 2 minutes, although other immersion times may also be used.

After exposing the optical component to the cleaning liquid for a period of time effective to remove substantially all contaminants that may inhibit subsequent contact with the optical blackening composition, the optical component may be dried before further processing. In applications where an acid solution is used to clean the optical component, residual acid solution present on the surface of the optical component may be removed by immersing the optical component and/or rinsing the optical component with clean water. In either case, the optical component may be dried either under atmospheric conditions (e.g., ambient temperature and/or pressure) or elevated thermal conditions (e.g., heat gun, drying oven) to remove residual liquid from the surface of the optical component. This can provide an optical component having a clean and dry surface for further processing.

The example technique of FIG. 1 further involves exposing a surface of the optical component to an optical blackening composition (102). The surface of the optical component exposed to the optical blackening composition may be one that is impinged with excitation light during operation of an optical sensor in which the optical component is incorporated. For example, the surface may define an optical pathway bounding the transmission of light through the optical sensor during operation. The optical pathway may define at least a portion of an optical housing optically connecting an emitter and/or detector of the optical sensor to an optical window. During operation, the fluid sample under analysis may contact one side of the optical window with the optical pathway being positioned on the opposite side of the optical window.

In some examples, a portion of the optical component is exposed to the optical blackening composition while a remainder of the optical component is not exposed to composition. In other examples, the entire optical component is exposed to the optical blackening composition, e.g., by immersing the optical component in the optical blackening composition. For example, the optical component may be exposed to the optical composition by immersing the optical component in reservoir containing the optical blackening composition, spraying the optical blacking composition on the component, rinsing the component with the optical blackening composition, or otherwise contacting one or more (e.g., all) of the surfaces of the component with the optical blackening composition. In either case, one or more desired surfaces of the optical component can be optically blackened using the optical blackening composition.

The optical blackening composition may be effective to blacken the surface of the optical component to which the composition is exposed, resulting in an optically blackened surface that is substantially or entirely non-fluorescing. For example, the optical component may be exposed to the optical blackening composition for a period of time effective to cause the surface of the optical component being treated to turn shade of black in color sufficient to absorb stray light impinging on the surface. During the process of optically blackening a metallic optical component, the component may transition from a metallic color, to a light olive color, to a dark olive color, to a dark grey color, and finally a substantially uniformly black color. While additional characteristics of an optically blackened surface according to the disclosure are described in greater detail below, in some applications, an optically blackened surface exhibits low or substantially no reflectivity to wavelengths of light within the ultraviolet spectrum (e.g., 10 nm to 400 nm). For example, the resulting optically blackened surface may exhibit less than 10% reflectivity to wavelengths of light within the ultraviolet spectrum, such as less than 5% reflectivity, less than 3% reflectivity, or less than 1% reflectivity. Additionally or alternatively, the optically blackened surface may exhibit less than 50% reflectivity to wavelengths of light within the visible light spectrum (e.g., 400 nm to 700 nm), such as less than 25% reflectivity, less than 10% reflectivity, or less than 5% reflectivity.

The optical blackening composition used to optically blacken the surface of the optical component may be an aqueous composition containing seleneous acid. In general, seleneous acid is an inorganic, oxygen-containing acid that may be formed by adding selenium dioxide to water and is represented by the formula $H_2SeO_3$. The concentration of the seleneous acid in the optical blackening composition may be effective to blacken the surface of the optical component being treated but not so strong as to etch or chemically degrade the surface being treated.

In some examples, the concentration of the seleneous acid in the optical blackening composition ranges from 0.01 volume percent to 10 volume percent of the optical blackening composition, such as from 0.05 volume percent to 1 volume percent of the optical blacking composition, or from 0.1 volume percent to 0.5 volume percent of the optical blacking composition. The concentration of water in the optical blacking composition with any of the foregoing ranges of seleneous acid may be greater than 80 volume percent of the overall composition, such as greater than greater than 90 volume percent, or greater than 95 volume percent. For example, the concentration water in the optical blacking composition may range from 95 volume percent of the overall composition to 99.9 percent of the composition.

Depending on the material used to form the optical component, the seleneous acid in the optical blacking composition may react with the material forming the optical component to form a blackened surface or surface coating without the presence of other reactive agents. In other examples, however, one or more additional components may be present in the optical blackening composition to help facilitate the blackening processing and/or the formation of an optically blackened coating on the surface of the optical component being treated.

In some examples, the optical blackening composition may include a transition metal that reacts with the seleneous acid (e.g., in the presence of oxygen) to optically blacken the surface of the component by forming an optically blackened coating over the underlying surface. Transition metals are generally considered those falling within Groups 3 through 12 of the periodic table. In one example, the transition metal included in the optical blackening composition includes (or, in other examples, consists of or consists essentially of) copper.'

When included, the transition metal may be selected and present in the optical blackening composition in an amount effective to form optically blackened coated surface on the optical component being treated that is substantially or entirely non-fluorescing. In some such examples, the transition metal may be present in the optical composition in an amount ranging from 0.01 volume percent of the optical blacking composition to 5 volume percent of the composition, such as from 0.1 volume percent of the composition to 3 volume percent of the composition.

When the optical component is exposed to an optical blacking composition that includes seleneous acid and one or more transition metals, an inorganic metal selenide coating may form, thereby optically blackening the surface of the component. For example, in the case of an optical blackening composition that includes copper and seleneous acid, a copper selenide coating may form on the surface of the optical component being treated. The thickness of the coating can vary, e.g., depending on the specific composition of the coating and the amount of time that the optical component is exposed to the coating. In some examples, the thickness of the coating is less than 250 micrometers, such as less than 25 micrometers, or less than 2.5 micrometers.

The amount of time to which the optical component is exposed to the optical blackening composition may vary, e.g., based on the composition of coating and desired level of optical blackening. In general, the amount of time that the surface of the optical component being treated is exposed to the optical coating composition may be effective to optically blacken the surface but not so much as to or chemically degrade the surface being treated. In some examples, the amount of time that the optical component is exposed to the optical blackening composition ranges from 15 seconds to 10 minutes, such as from 30 seconds to five minutes, or from a period ranging from 1 minute to 2 minutes.

The technique of FIG. 1 includes removing residual optical blacking composition from the surface of the optical component being treated (104) and subsequently drying the component (106). Residual optical blacking composition may be removed from the optical component being treated by removing the optical component from the source of optical blackening composition with which the component is being treated. In some examples, the optical component may be physically shaken to cause residual optical blackening composition on the surface of the component to shake off of the component. Additionally or alternatively, the optical component may be exposed to water (e.g., distilled water devoid of acid and/or optically blackening composition) to help remove residual optical blackening composition. For example, the optical component being treated may be removed from a reservoir containing optical blackening composition and rinsed under a flowing stream of water or immersed in a reservoir of water. This can remove optical blackening composition still residing on the component after the component has been removed from the source of optical blackening composition. Removing residual optical blackening composition from the optical component may be useful to quench any ongoing reaction, e.g., to help prevent etching in the surface of the component and/or to help prevent surface irregularities that may otherwise cause optical distortion.

After suitably removing residual optical blackening composition from the optical component being treated, the component can be dried (106). The optical component may be dried under atmospheric conditions (e.g., ambient temperature and/or pressure) and/or elevated thermal conditions (e.g., heat gun, drying oven) to dry the component. For example, the optical component may be dried at an elevated temperature ranging from 250 degrees Fahrenheit to 1350 degrees Fahrenheit. In some examples, the optical component is dried under atmospheric conditions by remaining exposed to ambient air for a period ranging from 30 seconds to 10 minutes followed by drying at an elevated temperature for a period ranging from 30 seconds to 5 minutes. The optical component may be dried until no visible moisture is present on the surface of the component. In some examples, the optically blackened surface of the optical component transitions from a shiny black appearance to a dull or matte black appearance to indicate when the component is suitably dried. The resulting optical component may be incorporated into an optical sensor, such as a fluorometer, that is subsequently used to measure a fluorometric response of a sample under analysis.

Figure 2:
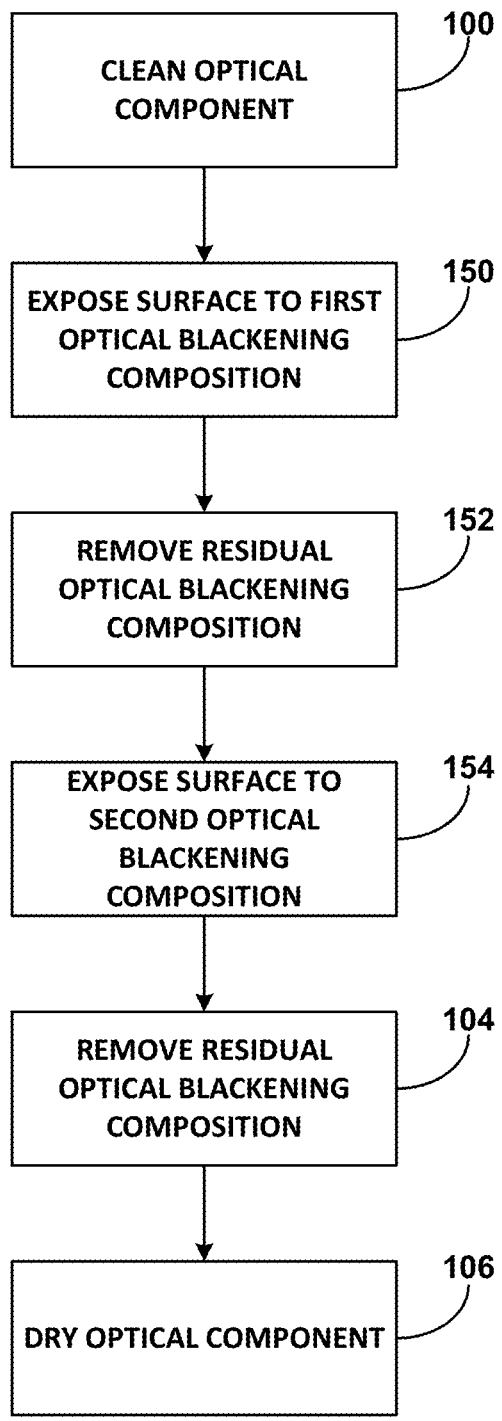
FIG. 2 is a flow diagram illustrating another example process for blackening an optical component.

FIG. 2 is a flow diagram illustrating another example process for blackening an optical component. The technique of FIG. 2 is the same as the example technique of FIG. 1 except that the surface of the optical component is exposed to multiple different optical blacking compositions. In particular, the example technique of FIG. 2 involves exposing the surface of the optical component being treated to two different optical blackening compositions after optionally cleaning the optical component.

As shown in FIG. 2, the optical blackening process may involve exposing the surface of the optical component being treated to a first optical blacking composition for a first amount of time (150), rinsing residue of the first optical blacking composition (152), and subsequently exposing the surface of the optical component being treated to a second optical blackening composition for a second amount of time (154). The first and second optical blacking compositions may be the same or may be different from each other. For example, the first and second optical blacking compositions may be different from each other in that they have different constituent components or the same constituent components in different concentrations.

Exposing the surface of the optical component being treated to multiple different rounds of optical blacking composition separated by intervening steps of in which residual optical blackening composition is removed may be useful to help prevent or minimize surface etching of the optical component. Depending on the material used to form the optical component, the surface of the component being treated may chemical etch if exposed to too high of a concentration of seleneous acid and/or for too long a period. By performing multiple rounds of treatment with optical blackening composition but limiting the exposure time of each round treatment, the optical component may be sufficiently optically blackened while minimizing undesired etching.

In some examples, the first optical blacking composition has a first concentration of seleneous acid while the second optical blackening composition has a second concentration of seleneous acid different than the first concentration. The second concentration of seleneous acid may be greater than the first concentration. By initially exposing the optical component to a comparatively weaker concentration of seleneous acid, a protective optically blackened coating may begin to form on the surface of the optical component. By subsequently exposing the optical component to a comparatively stronger concentration of seleneous acid, the initially-formed optically blackened coating may thicken and/or darken while limiting the extent to which the underlying structure of the optical coating is etched and/or chemically degraded.

The first optical blacking composition and second optical blacking composition may be formed of those constituent components and falling within the ranges discussed above with respect to FIG. 1. In some examples, the concentration of seleneous acid in the second optical blackening composition is at least 20 percent greater than the concentration in the first optical blackening composition, such as at least 40 percent greater. For example, the concentration of seleneous acid in the second optical blackening composition may range from 20 percent to 200 percent greater than the concentration of seleneous acid in the first optical blacking composition, such as from 40 percent to 100 percent greater. In instances in which the first and second optical blackening compositions include a transition metal, the transition metal may be the same in both compositions and may or may not be at the same concentration in both compositions.

In some examples, the optical component is exposed to a first optical blackening composition that has a first concentration of seleneous acid ranging from 0.1 volume percent to 0.4 volume percent of the optical blackening composition followed by exposure to a second optical blackening composition that has a second concentration of seleneous acid ranging from 0.15 volume percent to 0.6 volume percent of the optical blackening composition. The optical component may be exposed to the first optical blacking composition for a first period of time and the second optical blacking composition for a second period of time. The first period of time may be the same as or different than the second period of time.

For example, the first period of time may be greater than the second period of time. A ratio of the first period of time to the second period may range from 1.5:1 to 3:1. For example, the optical component may be exposed to the first optical composition for a period of time ranging from 30 seconds to 3 minutes and the second optical composition for a period of time ranging from 15 seconds to 1.5 minutes.

The technique of FIG. 2 includes removing residual optical blacking composition from the surface of the optical component being treated (152) between being exposed to the first optical blacking composition (150) and being exposed to the second optical blackening composition (152). Removal techniques can include those discussed above with respect to FIG. 1 at step (104). For example, residual optical blacking composition may be removed by removing the optical component from a source of the first optical blackening composition and exposing the optical component to water (e.g., distilled water devoid of acid and/or optical blackening composition) to help remove residual optical blackening composition. For example, the optical component being treated may be under a flowing stream of water or immersed in a reservoir of water to remove any amount of the first optical blackening composition still residing on the component after the component has been removed from the source of first optical blackening composition. The optical component may or may not be dried before being exposed to the second optical blacking composition. After exposing the optical component to the second optical blackening composition, further process steps of removing residual second optical blacking composition and drying the optical component can be performed, as discussed above with respect to FIG. 1.

The surface of an optical component optically blackened according to the techniques described herein can be substantially or entirely non-fluorescing, e.g., in response to having light at one or more excitation wavelengths shine on the surface. Fluorescent emissions may be characterized as light emissions at a comparatively longer wavelength that occur as a result of incident radiation at of a shorter wavelength. The surface of an optical component optically blackened as described herein may be substantially non-fluorescing such that the surface emits a sufficiently small amount of light at a longer wavelength in response to having light at a shorter wavelength directed at the surface such that the emissions from the surface do not interfere with the fluorescent measurement of a sample under analysis. The surface of an optical component optically blackened as described herein may be entirely non-fluorescing such that the surface does not emit light at a longer wavelength in response to having light at a shorter wavelength directed at the surface.

The surface of an optical component optically blackened according to the techniques described herein can be substantially or entirely non-fluorescing in response to incident excitation light within the ultraviolet spectrum (e.g., 10 nm to 400 nm) and/or visible light spectrum (e.g., 400 nm to 700 nm). For example, the surface may be substantially or entirely non-fluorescing in response to excitation light at one or more wavelengths ranging from 250 nm to 600 nm, such as from 260 nanometers to 350 nanometers.

Depending on the characteristics of the optically blackened surface of the optical component, the surface may not be entirely non-fluorescing but may instead emit fluorescent emissions at such a low level of fluorescence as to not materially interfere with measurement of the fluorescence response of any sample under analysis. For example, the surface of the optical component may emit less or weaker fluorescent radiation than the amount or magnitude of fluorescent radiation emitted by the sample under analysis. Fluorescent radiation emitted by the surface and/or sample under analysis may be in the visible light or near visible light portion of the UV spectrum, such as from 290 nm to 450 nm, or 300 nm to 350 nm.

Accordingly, an optical component treated according to the techniques of the present disclosure can have an optically blackened surface that is not anodized and is devoid of a coating containing organic molecules. Anodized surface treatments and organic blackening coatings can exhibit an unacceptably high level of fluorescent emissions that interfere with measurement of fluorescent response of a sample under analysis. The resulting optical component can be combined with additional hardware and/or software components to produce an optical sensor (e.g., fluorometer) containing the optical component.

Figure 3:
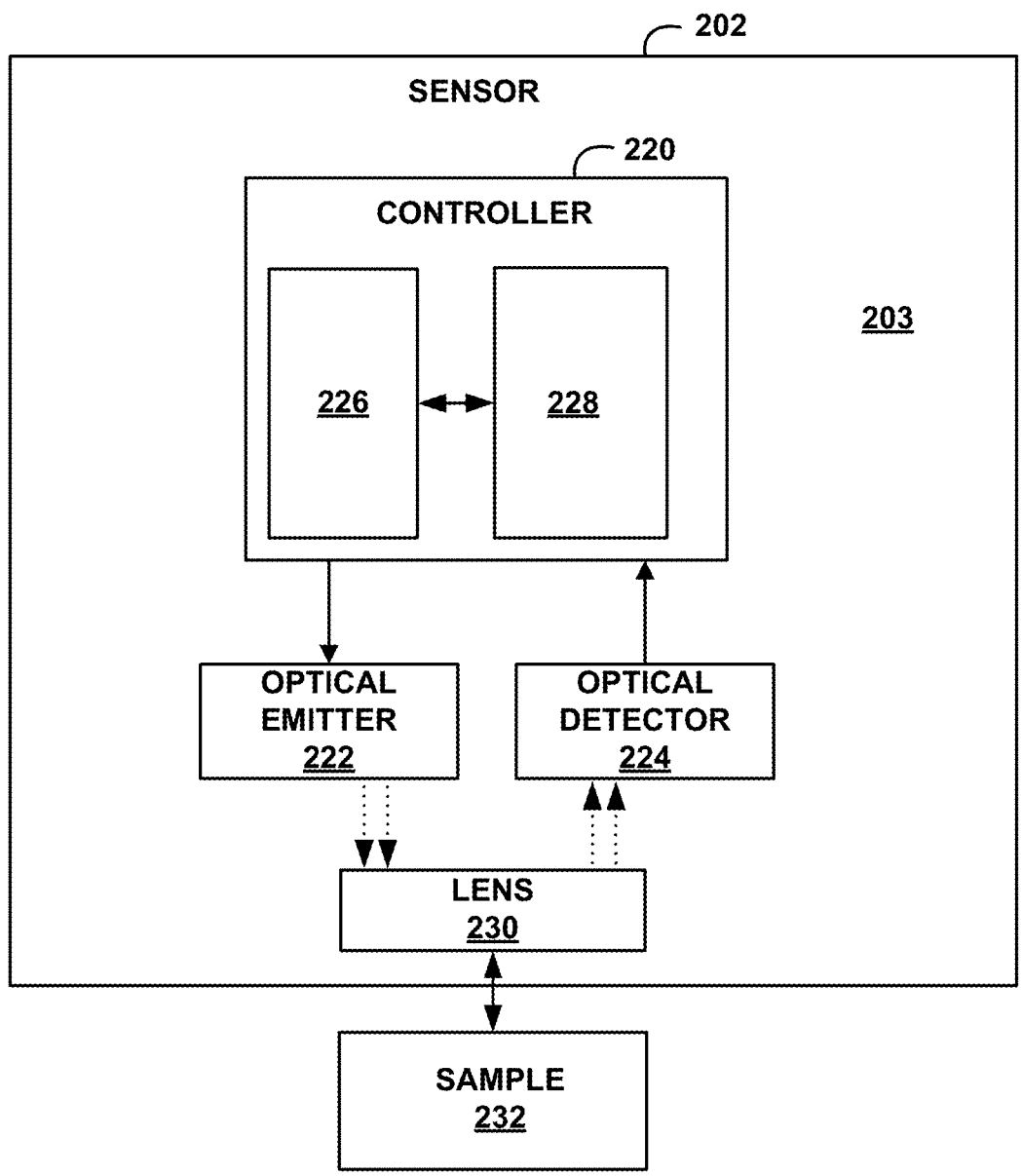
FIG. 3 is a block diagram of an example configuration of an optical sensor that may include an optically blackened component according to the disclosure.

While the optical sensor in which the optical component is incorporated can have a variety of different configurations, FIG. 3 is a block diagram of one example configuration of an optical sensor that may include an optically blackened component according to the disclosure. In this example, optical sensor 202 includes a housing 203, controller 220, one or more optical emitters 222 (referred to herein as "optical emitter 222"), one or more optical detectors 224 (referred to herein as "optical detector 224"), and lens 230. Controller 220 includes a processor 226 and a memory 228. Housing 203 contains various electronic components of optical sensor 202 and also defines optical pathways to control light movement to and from lens 230. In operation, optical emitter 222 directs light into fluid sample 232 and optical detector 224 detects fluorescent emissions generated by the sample. The light directed into the fluid by optical emitter 222 may generate fluorescent emissions by exciting electrons of fluorescing molecules within the fluid, causing the molecules to emit energy (i.e., fluoresce) that can be detected by optical detector 224. For example, optical emitter 222 may direct light at one frequency (e.g., ultraviolet frequency) into fluid sample 232 and cause fluorescing molecules to emit light energy at a different frequency (e.g., visible light frequency).

Memory 228 stores software and data used or generated by controller 220. For example, memory 228 may store data used by controller 220 to determine a concentration of one or more chemical components within the fluid being monitored by optical sensor 202. In some examples, memory 228 stores data in the form of an equation that relates fluorescent emissions detected by optical detector 224 to a concentration of one or more chemical components.

Processor 226 runs software stored in memory 228 to perform functions attributed to optical sensor 202 and controller 220 in this disclosure. Components described as processors within controller 220, controller 104, or any other device described in this disclosure may each include one or more processors, such as one or more microprocessors, digital signal processors (DSPs), application specific integrated circuits (ASICs), field programmable gate arrays (FPGAs), programmable logic circuitry, or the like, either alone or in any suitable combination.

Optical emitter 222 includes at least one optical emitter that emits optical energy into fluid sample 232. In some examples, optical emitter 222 emits optical energy over a range of wavelengths. In other examples, optical emitter 222 emits optical energy at one or more discrete wavelengths. For example, optical emitter 222 may emit at two, three, four or more discrete wavelengths.

In one example, optical emitter 222 emits light within the ultraviolet (UV) spectrum. Light within the UV spectrum may include wavelengths in the range from approximately 200 nm to approximately 400 nanometers. Light emitted by optical emitter 222 is directed into fluid sample 232. In response to receiving the optical energy, fluorescing molecules within the fluid may excite, causing the molecules to produce fluorescent emissions. The fluorescent emissions, which may or may not be at a different frequency than the energy emitted by optical emitter 222, may be generated as excited electrons within fluorescing molecules change energy states. The energy emitted by the fluorescing molecules may be detected by optical detector 224. For example, optical emitter 222 may emit light in the frequency range of approximately 260 nm to approximately 290 nm and, depending on the composition of the fluid, cause fluorescent emissions in the range of approximately 300 nm to approximately 350 nm.

Optical emitter 222 may be implemented in a variety of different ways within optical sensor 202. Optical emitter 222 may include one or more light sources to excite molecules within the fluid. Example light sources include light emitting diodes (LEDS), lasers, and lamps. In some examples, optical emitter 222 includes an optical filter to filter light emitted by the light source. Optical sensor 202 also includes optical detector 224. Optical detector 224 includes at least one optical detector that detects fluorescent emissions emitted by excited molecules within fluid sample 232. Optical detector 224 may include one or more photodetectors such as, e.g., photodiodes or photomultipliers, for converting optical signals into electrical signals. In some examples, optical detector 224 includes a lens positioned between the fluid and the photodetector for focusing and/or shaping optical energy received from the fluid.

While optical sensor 202 can have a variety of different configurations as described above, in some examples, optical sensor 202 is designed to have lens 230 through which light is emitted into fluid sample 232 and also received from fluid sample 232. This arrangement allows light to be collected from fluid sample 232 through lens 230 at 180 degrees backscattering geometry. This arrangement provides a sensitive optical system that can be used to detect weak fluorescence signals in low volume samples. Such an arrangement is described in greater detail in U.S. Pat. No. 9,618,450, entitled "Multi-Channel Fluorometric Sensor and Method of Using Same" and issued Apr. 2, 2015, which is hereby incorporated by reference in its entirety.

Any optical component in optical sensor 202 may be optically blackened according to the techniques of the present disclosure. In some examples, an optical component that is optically blackened is housing 203 or a portion thereof that defines an optical pathway through which light transmits from optical emitter 222 into sample 232 and/or from sample 232 to optical detector 224. The surface of the housing defining the optical pathway may receive radiation from optical emitter 222 (e.g., which may cause fluorescence if not suitably treated) and may also transmit fluorescent emissions emitted by sample 232 to optical detector 232.

Figure 4:
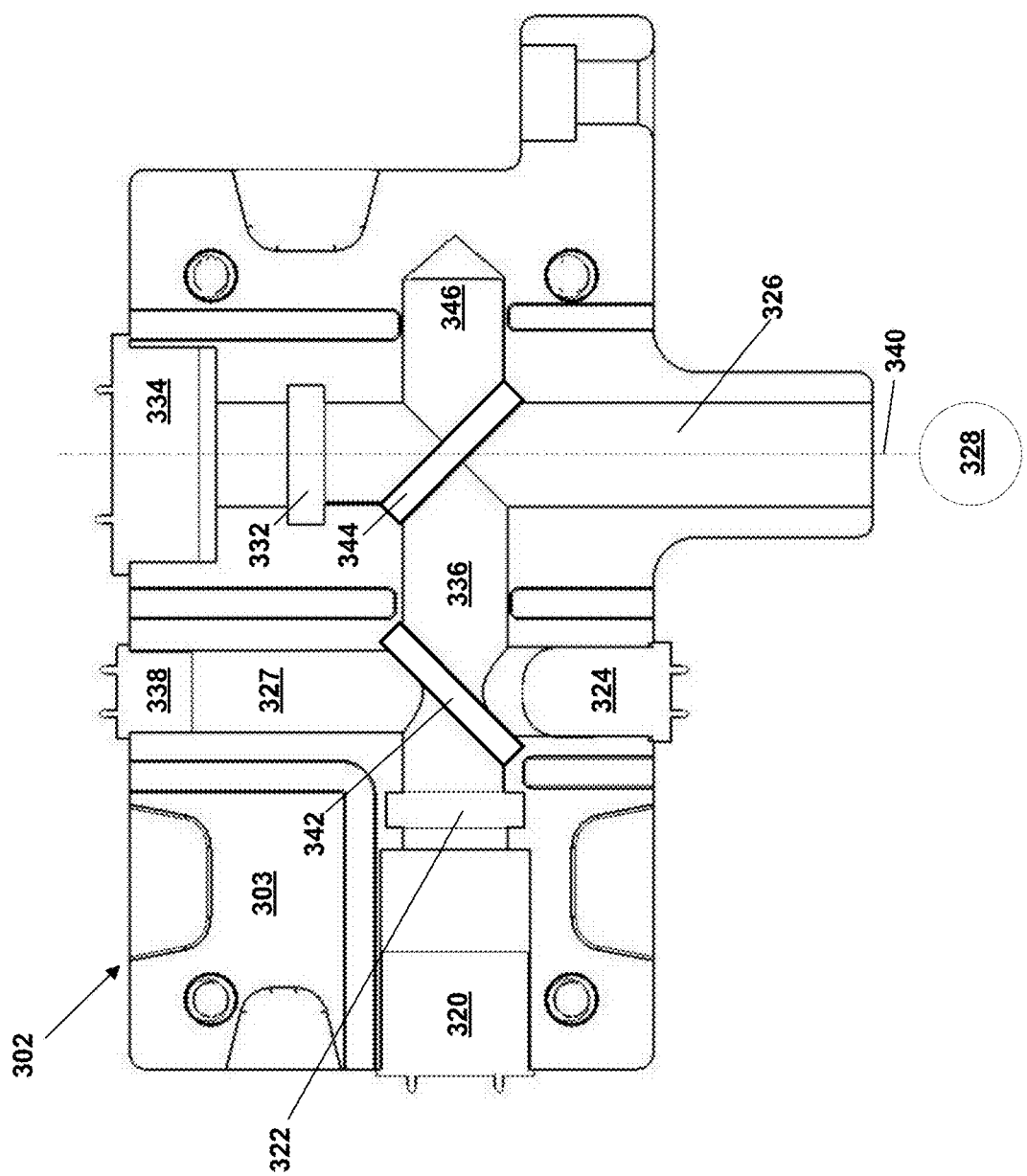
FIG. 4 is a schematic drawing of an example arrangement of components that may be used for the optical sensor of FIG. 3 and which may include one or more optical components optically blackened according to the techniques of the present disclosure.

FIG. 4 is a schematic drawing of an example arrangement of components that may be used for the optical sensor of FIG. 3 and which may include one or more optical components optically blackened according to the techniques of the present disclosure. FIG. 4 illustrates a sensor 302 that includes a first optical emitter 320 and a second optical emitter 324. During operation, the first optical emitter 320 can emit light at a first wavelength while the second optical emitter 324 can emit light at a second wavelength. Depending on the application, the first optical emitter 320 and second optical emitter 324 can emit light within the ultraviolet (UV), infrared (IR), and/or visible light spectrum. In some examples as described above, the first wavelength may cause molecules in the fluid sample under analysis (e.g., fluid sample 230) to excite and fluoresce, while the second wavelength may scatter off the fluid sample under analysis.

Additionally, the first 320 and/or second 324 optical emitter may be such that one or both emit unnecessary or unwanted light in addition to the first or second wavelengths of light desired to be emitted. To prevent such light from undesirably affecting measurements, sensor 302 may include a first optical filter 322 configured to limit the light emitted by the first optical emitter 320 into the sample under analysis. The embodiment of FIG. 4 shows a first optical filter 322 positioned between the first optical emitter 320 and a partially reflective optical window 342. The first optical filter 322 can be configured to filter out, for example, substantially all wavelengths of light within a range of fluorescent light emitted by the fluid sample, when the fluid sample emits fluorescence. Such a filter 322 can help eliminate false fluorescence detection by detector 334 in the sensor due to scattering of light within the same wavelength range as the fluorescent emissions. For example, if the first optical emitter 320 were to emit light within the wavelength of the fluorescent emissions generated by the fluid sample under analysis, the optical detector 334 may detect both fluorescent emissions generated by the fluid sample and light emitted by the first optical emitter 320 and scattered back to the optical detector 334. Optical filter 322 can filter out light emitted by the first optical detector 334 within the wavelength range of the fluorescent emissions.

The sensor 302 in the example of FIG. 4 also includes a housing 303 that houses various hardware/software components of the sensor and controls light movement through the sensor. In some embodiments, the housing 303 contains all or some of the first optical emitter 320 and/or the second optical emitter 324, while in other embodiments, the emitters are located external to the housing 303.

The example shown in FIG. 4 includes an optical detector 334, an optical window 328 (e.g., optical lens 328) for directing light into and receiving light from a fluid sample, and an optical pathway 326. In the illustrated example, optical lens 328 is shown physically separate from but optically connected to optical pathway 326. In other examples, lens 328 is physically connected (e.g., attached) at a terminal end of the optical pathway.

To control light movement through optical sensor 302, the optical sensor includes at least one optical pathway which, in the illustrated example is shown as three optical pathways: a first optical pathway 326, a second optical pathway 336, and a third optical pathway 327. The optical pathways may define bounded channels, tubes, conduits, or cavities that control light movement through the sensor. The emitters and detectors of optical sensor 302 may be arranged around the optical pathways to direct light into the optical pathways and/or receive light from the optical pathways. For example, the first optical emitter 320 and second optical emitter 324 in FIG. 4 are configured to direct light into the first optical pathway 326 that is optically connected to the optical lens 328 and, subsequently, the fluid sample under analysis. Further, the optical detector 334 in FIG. 4 is configured to receive light from the first optical pathway 326 that emanates from the fluid sample under analysis and travels through optical lens 328. One or more (e.g., all of the optical pathways) may be optically blackened using the techniques of the present disclosure. For example, housing 303 may be formed of metal and the entire housing optically blackened.

The optical sensor 302 can have a number of different optical pathway configurations and the configurations can vary, e.g., based on the number of optical emitters and detectors contained in the sensor. In the example of FIG. 4, optical sensor 302 includes the first optical pathway 326 positioned between optical lens 328 and the first optical detector 334. Light traveling linearly through the optical lens 328 (e.g., an optical center of the lens) can travel through the first optical pathway 326 and impinge on the first optical detector 334 (e.g., an optical center of the detector). In such an example, the first optical pathway 326 may define a major axis 340 extending along the length of the pathway and extending through a center of the optical lens 328 (e.g., an optical center) and a center of the first optical detector 334 (e.g., an optical center of the detector). The first optical pathway 326 may be optically connected to a single optical window of the detector (e.g., optical lens 328) to other components housed within housing 303.

The first optical emitter 320 and the second optical emitter 324 are configured to emit light into the first optical pathway 326 and, subsequently, into the fluid sample under analysis. In some examples, the first optical emitter 320 and/or the second optical emitter 324 emit light directly into the first optical pathway 326, e.g., without emitting into an intervening optical pathway that intersects the first optical pathway. In other examples, the first optical emitter 320 and/or the second optical emitter 324 emit light into an intermediate optical pathway that is optically connected to the first optical pathway 326. That is, the first optical emitter 320 and/or the second optical emitter 324 may indirectly emit light into the first optical pathway 326.

In optical sensor 302 in FIG. 4, the first optical emitter 320 is positioned to emit light into the second optical pathway 336 that extends to the first optical pathway 326. Further, the second optical emitter 324 is positioned to emit light into the third optical pathway 327 that extends to the second optical pathway 336 which, in turn, extends to the first optical pathway 326. The second optical pathway 336 intersects the first optical pathway 326, allowing at least a portion of the light transmitting from the first optical emitter 320 and second optical emitter 324 to travel through the second optical pathway, into the first optical pathway, and through the optical lens 328. The third optical pathway 327 intersects the second optical pathway, allowing at least a portion of the light transmitting from the second optical emitter 324 to travel through the third optical pathway, into the second optical pathway, into the first optical pathway, and through the optical lens 328.

Although the configuration can vary, the second optical pathway 336 in FIG. 4 intersects the first optical pathway 326 at an approximately 90 degree angle. Further, the third optical pathway 327 intersects the second optical pathway 336 at an approximately 90 degree angle. In some examples, the third optical pathway 327 extends parallel to the first optical pathway 326, while in other examples, the third optical pathway does not extend parallel to the first optical pathway. By arranging the optical emitters and optical detectors of optical sensor 302 around intersecting optical pathways optically connected to a single optical lens 328, the sensor can provide a compact design that is easily installed in a variety of chemical and fluid processes.

In examples in which the optical sensor 302 includes intersecting optical pathways to control light movement, the optical sensor may also include optical elements (e.g., reflectors, partially reflective optical windows) that direct light received from one intersecting optical pathway into another intersecting optical pathway. The optical elements can help control the direction of light movement to optical lens 328 and/or to the optical detectors 334, 338.

In the illustrated example of FIG. 4, the sensor includes a partially reflective optical window 344 that is positioned at the intersection of the first 326 and second 336 optical pathways. The partially reflective optical window 344 is configured to reflect at least a portion of light emitted by the first optical emitter 320 and the second optical emitter 324 from the second optical pathway 336 to the first optical pathway 326. In some embodiments, the sensor 302 further includes a beam dump 346, positioned opposite the partially reflective optical window 344 from the first 320 and second 324 optical emitters along the second optical pathway 336. The beam dump 346 is configured to absorb or trap any light that is incident thereon. For example, in some embodiments, any light that is transmitted from the second optical pathway 336 through the partially reflective optical window 344 will be transmitted to the beam dump 346 where it will be absorbed and prevented from being detected by optical detector 334.

Optical sensor 302 in FIG. 4 also includes a second optical detector 338, which may function as a reference detector for the sensor. The second optical detector 338 is positioned to receive light emitted by the first optical emitter 320 and the second optical emitter 324. Although the location can vary, in the illustrated example, the second optical detector 338 is positioned on an opposite side of the second optical pathway 336 from the second optical emitter 324. In particular, the second optical detector 338 is positioned at a terminal end of the third optical pathway 327, opposite the second optical emitter 324.

Optical pathways in optical sensor 302 may be channels or ducts that allow light to be conveyed through the optical sensor. The optical pathways may also be machined or cast into the housing 303 of the optical sensor. One or more (e.g., all) of the optical pathways may be optically blackened using the techniques described herein. In some examples, housing 303 is formed of metal optical pathways machined, cast, or otherwise formed in the body of the material defining the housing. The entirety of the housing may be optically blackened by exposing the entire housing to an optical blacking process as described herein.

An optical sensor according to the disclosure can be used in a variety of applications, including monitoring industrial processes. An optical sensor can be implemented as a portable, hand-held device that is used to periodically analyze the optical characteristics of a fluid in an industrial process. Alternatively, an optical sensor can be installed online to continuously analyze the optical characteristics of a fluid in an industrial process. In either case, the optical sensor may optically analyze the fluid sample and determine different characteristics of the fluid, such as the concentration of one or more chemical species in the fluid.

As one example, optical sensors are often used in industrial cleaning and sanitizing applications. During an industrial cleaning and sanitizing process, water is typically pumped through an industrial piping system to flush the piping system of product residing in pipes and any contamination build-up inside the pipes. The water may also contain a sanitizing agent that functions to sanitize and disinfect the piping system. The cleaning and sanitizing process can prepare the piping system to receive new product and/or a different product than was previously processed on the system.

An optical sensor can be used to monitor the characteristics of flushing and/or sanitizing water flowing through a piping system during an industrial cleaning and sanitizing process. Either continuously or on an intermittent basis, samples of water may be extracted from the piping system and delivered to the optical sensor. Within the optical sensor, light is emitted into the water sample and used to evaluate the characteristics of the water sample. The optical sensor may determine whether residual product in the piping system has been sufficiently flushed out of the pipes, for example, by determining that there is little or no residual product in the water sample. The optical sensor may also determine the concentration of sanitizer in the water sample, for example, by measuring a fluorescent signal emitted by the sanitizer in response to the light emitted into the water sample. If it is determined that there is an insufficient amount of sanitizer in the water sample to properly sanitize the piping system, the amount of sanitizer may be increased to ensure proper sanitizing of the system. While this describes one example application for an optical sensor according to the disclosure, it should be appreciated that the described devices and techniques can be used for any desired application and the disclosure is not limited to the example of monitoring water for sanitizer concentration. Other fluorometric measuring processes can be performed using an optical sensor containing one or more optically blackened components as described herein, and the disclosure is not limited in this respect.

The following examples may provide additional details about optical blackening in accordance with this disclosure.

EXAMPLE

An optical housing formed of an aluminum block defining optical pathways consistent with those illustrated in FIG. 4 was optically blackened following techniques in accordance with the present disclosure. The aluminum block was cleaned in a 10 volume percent solution of E-Kleen 154, commercially available from Electrochemical Products, Inc. by immersing the block in the solution for 2 minutes and washing with vigorous agitation. E-Kleen 154 is a phosphoric acid cleaner containing 40-60% phosphoric acid. The aluminum block was subsequently rinsed under a bath of running tap water for 30 seconds and excess water shaken off of the component.

Immediately after cleaning, the wet aluminum block was immersed in a 10 volume percent solution of Insta-Blak A-385 commercially available from Electrochemical Products, Inc. for 1 minute. Insta-Blak A-385 is selenous acid composition containing from 1-4% selenous acid, 85-95% water, and 0-3% copper. The aluminum block was rinsed under a bath of running tap water for 30 seconds. Subsequently, the aluminum block was immersed in a 15 volume percent solution of Insta-Blak A-385 for 10 seconds.

After withdrawing the aluminum block from the second treatment of Insta-Blak A-385, the aluminum block was rinsed under a bath of running tap water for 30 seconds and excess water shaken off of the component. The aluminum block was air dried for 5 minutes and subsequently dried with a heat gun for 1 minute until no visible moisture was present on the aluminum block. The resulting dried surface, without any further sealants or overlaying coatings, formed an optically blackened optical pathway that was impinged with excitation light to test fluorometric response.

For comparison purposes, an aluminum optical housing was coated with black acrylic paint and a separate aluminum optical housing was anodized and coated with black dye.

The fluorescence response of the working sample and comparative samples were evaluated. The fluorescence intensity of each optical component was measured with a fluorometer by emitting light at a wavelength of 270 nanometers and detecting the fluorescent radiation from the optical housing in a wavelength range from 295 nanometers to 495 nanometers. The fluorometer was also used to measure the fluorescence intensity of a target tracer molecule sodium xylene sulfonate (SXS) in a fluid sample. The fluorescence signal of the SXS was compared to the fluorescence signal of the blackened aluminum optical housing itself for each of the working sample and comparative samples.

Figure 5:
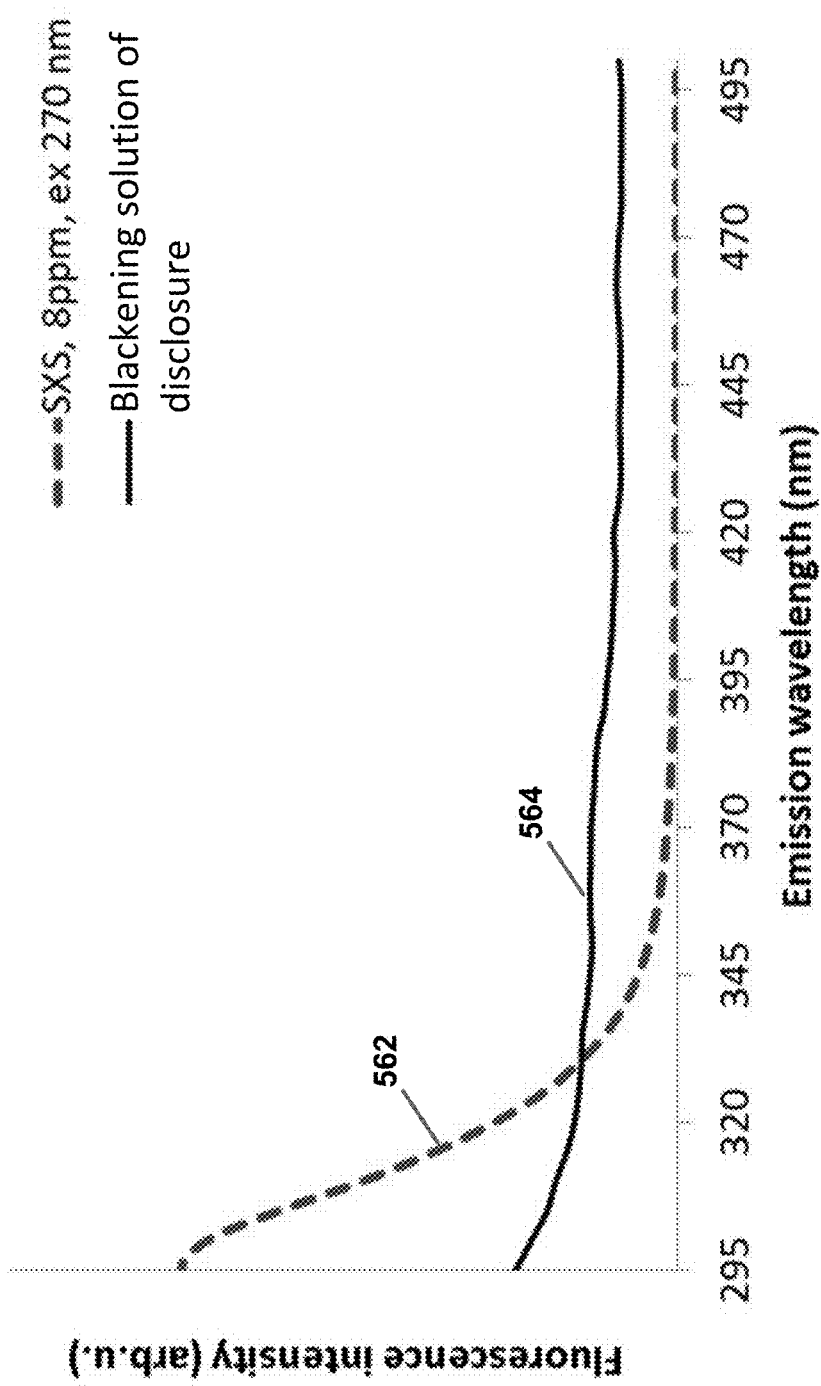
FIG. 5 is an example plot illustrating the fluorescence of a target tracer molecule relative to the fluorescence of an optical component treated with an optical blackening composition in accordance with the disclosure.

FIG. 5 is an example plot illustrating the fluorescence of a target tracer molecule (SXS) 562 relative to the fluorescence of an optical component treated with a blackening solution in accordance with the disclosure 562. Both the optical component and a fluid sample with the SXS were exposed to light emitted at a wavelength of 270 nanometers and the resulting fluorescence radiation emitted in a wavelength range from 295 nanometers to 495 nanometers by the SXS and the optical component was detected. As shown in FIG. 5, the fluorescence intensity of the SXS is significantly greater than that of the optical component in a wavelength range from 295 nanometers to 330 nanometers. As shown in FIG. 5, this is the critical wavelength range for detecting emission of fluorescent radiation from SXS in order to determine the concentration of SXS in a fluid sample. The fluorescent radiation emitted by the optical component does not significantly interfere with the signal from the SXS, allowing for a high signal-to-background ration and thus an accurate determination of the concentration of SXS in a fluid sample.

Figure 6:
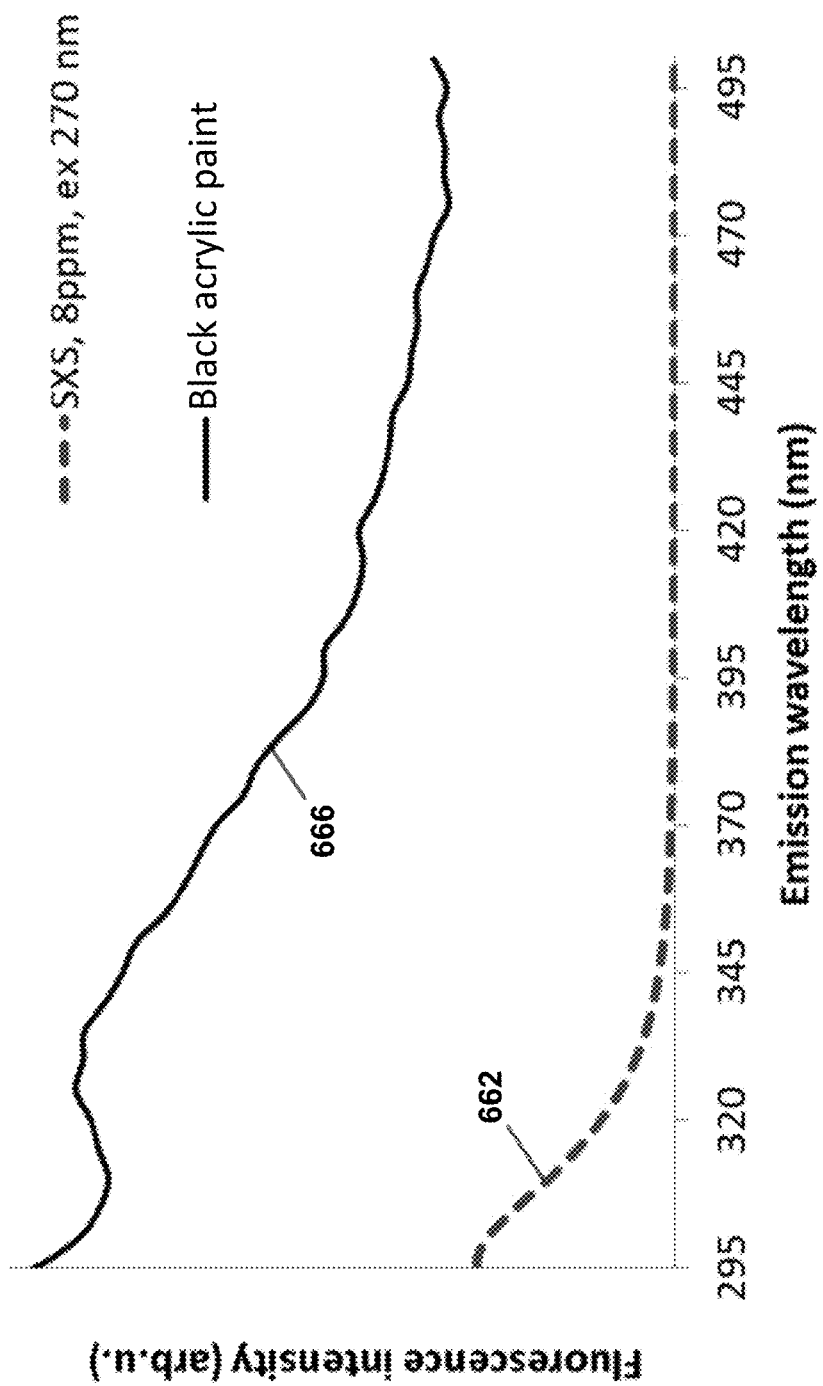
FIG. 6 is an example plot illustrating the fluorescence of a target tracer molecule relative to the fluorescence of an optical component coated with black acrylic paint.

FIG. 6 is an example plot illustrating the fluorescence of a target tracer molecule (SXS) relative to the fluorescence of an optical component coated with black acrylic paint. Both the optical component and a fluid sample with the SXS were exposed to light emitted at a wavelength of 270 nanometers and the resulting fluorescence radiation emitted in a wavelength range from 295 nanometers to 495 nanometers by the SXS and the optical component was detected. As shown in FIG. 6, the fluorescence intensity of the SXS is significantly lower than that of the optical component in the entire wavelength range, particularly in the critical wavelength range of 295 nanometers to 330 nanometers. The fluorescent radiation emitted by the optical component significantly interferes with the signal from the SXS, resulting in a low signal-to-background ration and thus an inaccurate determination of the concentration of SXS in a fluid sample.

Figure 7:
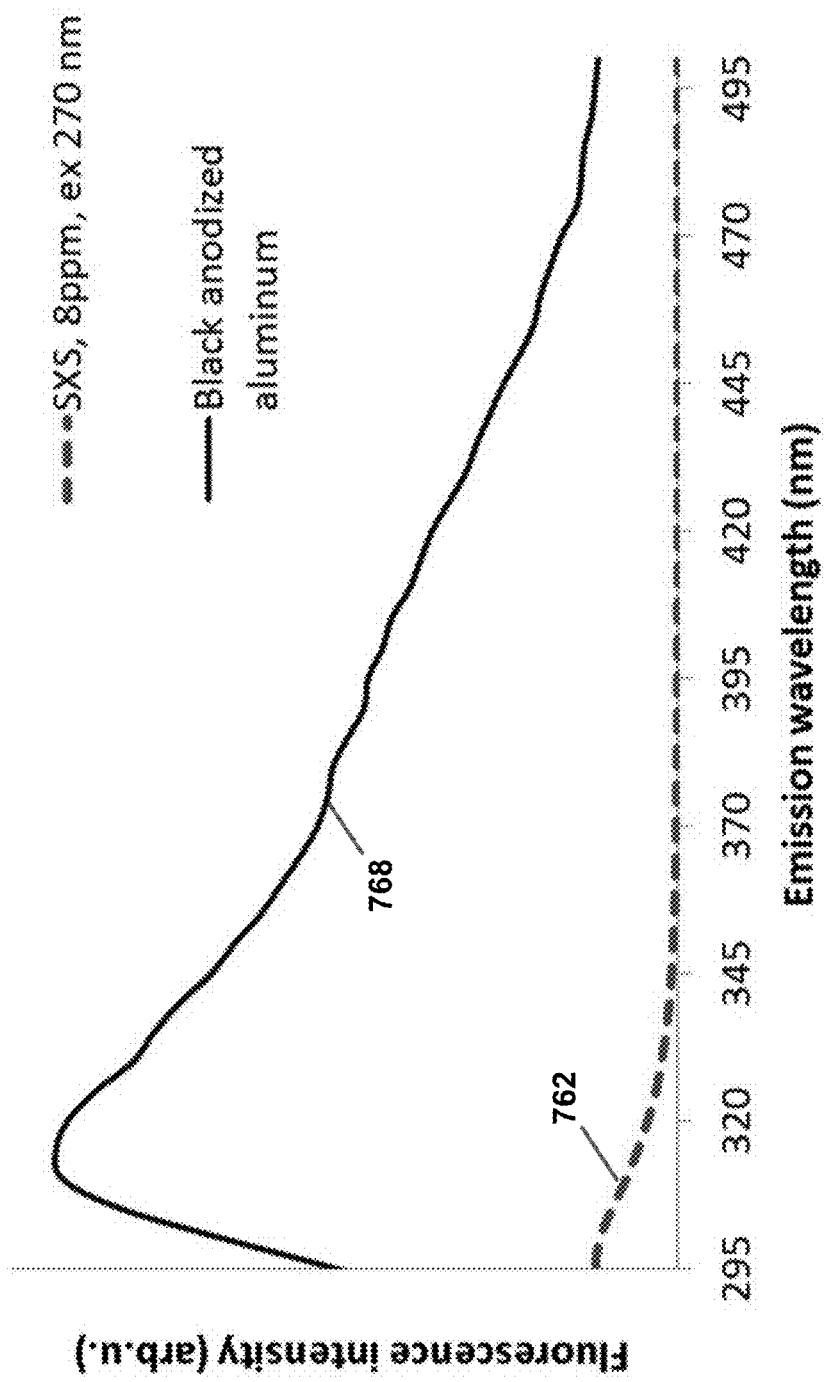
FIG. 7 is an example plot illustrating the fluorescence of a target tracer molecule relative to the fluorescence of a black anodized aluminum optical component.

FIG. 7 is an example plot illustrating the fluorescence of a target tracer molecule (SXS) relative to the fluorescence of a black anodized aluminum optical component. Both the optical component and a fluid sample with the SXS were exposed to light emitted at a wavelength of 270 nanometers and the resulting fluorescence radiation emitted in a wavelength range from 295 nanometers to 495 nanometers by the SXS and the optical component was detected. As shown in FIG. 7, the fluorescence intensity of the SXS is significantly lower than that of the optical component in the entire wavelength range, particularly in the critical wavelength range of 295 nanometers to 330 nanometers. The fluorescent radiation emitted by the optical component significantly interferes with the signal from the SXS, resulting in a low signal-to-background ration and thus an inaccurate determination of the concentration of SXS in a fluid sample.

The invention claimed is:

1. A method of blackening an optical component comprising:
exposing a surface of an optical component that defines an optical pathway to an optical blackening composition that comprises selenous acid for a period of time effective to optically blacken the surface and yield an optically blackened optical pathway that is non-fluorescing;
removing residual optical blackening composition from the surface of the optical component; and
drying the optical component.

2. The method of claim 1, wherein the optical pathway is non-fluorescing such that the surface defining the optically blackened pathway does not emit fluorescent emissions when exposed to ultraviolet light.

3. The method of claim 1, wherein the optical pathway is non-fluorescing such that the surface defining the optically blackened pathway does not emit fluorescent emissions when exposed to light within a range from 250 nm to 600 nm.

4. The method of claim 1, wherein the optical blackening composition is devoid of organic dyes.

5. The method of claim 1, wherein seleneous acid ranges from 0.05 volume percent to 1 volume percent of the optical blackening composition and greater than 80 volume percent water.

6. The method of claim 5, wherein exposing the surface of the optical component to the optical blackening composition comprising selenous acid comprises:
exposing the surface of the optical component to a first concentration of selenous acid;
removing residual selenous acid at the first concentration from the surface; and
subsequently exposing the surface of the optical component to a second concentration of selenous acid greater than the first concentration.

7. The method of claim 6, wherein exposing the surface of the optical component to the first concentration of selenous acid comprises exposing the surface of the optical component to the first concentration of selenous acid for an amount of time longer than the surface of the optical component is exposed to the second concentration of selenous acid.

8. The method of claim 6, wherein the first concentration of selenous acid ranges from 0.1 volume percent to 0.4 volume percent of the optical blackening composition, and the second concentration of selenous acid ranges from 0.15 volume percent to 0.6 volume percent of the optical blackening composition.

9. The method of claim 1, wherein the optical blackening composition comprises a transition metal.

10. The method of claim 9, wherein the transition metal is copper ranging from 0.1 to 3 volume percent of the optical blackening composition.

11. The method of claim 1, wherein:
exposing the surface of the optical component to the optical blackening composition comprises immersing the optical component the optical blackening composition,
removing residual optical blackening composition from the surface of the optical component comprises rinsing the surface of the optical component with water, and
drying the optical component comprises drying at a temperature ranging from 250 degrees Fahrenheit to 1350 degrees Fahrenheit.

12. The method of claim 1, wherein the period of time ranges from 30 seconds to five minutes.

13. The method of claim 1, further comprising, prior to exposing the surface of the optical component to the optical blackening composition, cleaning the surface with phosphoric acid.

14. The method of claim 1, wherein the optical component is fabricated from aluminum or stainless steel.

15. The method of claim 1, wherein the optical component is a housing for an optical sensor that defines an opening for an optical emitter and an opening for an optical detector, wherein the optical pathway is arranged to direct light from the optical emitter through an optical window optically connected to the optical pathway into a fluid sample under analysis and receive light from the fluid sample through the optical window and direct the light to the optical detector.

16. An optical component comprising:
a surface formed of metal that defines an optical pathway configured to receive light from a fluid sample under analysis through an optical lens,
wherein the surface is optically blackened with a metal selenide and does not emit fluorescent emissions in response to being exposed to ultraviolet light.

17. The optical component of claim 16, wherein the metal is copper and the optical component is fabricated from aluminum or stainless steel.

18. The optical component of claim 16, wherein the surface is not anodized and is devoid of a coating containing organic molecules.

19. The optical component of claim 16, wherein the optical component is a housing for an optical sensor that defines an opening for an optical emitter and an opening for an optical detector, wherein the optical pathway is arranged to direct light from the optical emitter through an optical window optically connected to the optical pathway into a fluid sample under analysis and receive light from the fluid sample through the optical window and direct the light to the optical detector.

20. An optical sensor comprising:
   a housing having an optical pathway that directs light through an optical window optically connected to the optical pathway into a fluid sample under analysis and receives light from the fluid sample through the optical window;
   an optical emitter that is positioned to emit light into the optical pathway; and
   an optical detector that is positioned to receive light from the optical pathway,
   wherein the housing is formed of metal and a surface of the housing defining the optical pathway is optically blackened with a metal selenide and emits weaker fluorescent radiation than fluorescent radiation emitted by the fluid sample under analysis in response to exposure to ultraviolet light.

21. The optical sensor of claim 20, wherein the surface of the housing defining the optical pathway does not emit fluorescent emissions in response to being exposed to light within a wavelength from 250 nanometers to 600 nanometers.

22. The optical sensor of claim 20, wherein the metal is copper and the optical component is fabricated from aluminum or stainless steel.

23. The optical sensor of claim 20, wherein the surface is not anodized and is devoid of a coating containing organic molecules.

* * * * *

UNITED STATES PATENT AND TRADEMARK OFFICE
CERTIFICATE OF CORRECTION

| | | |
|---|---|---|
| PATENT NO. | : 10,845,309 B2 | Page 1 of 1 |
| APPLICATION NO. | : 16/227660 | |
| DATED | : November 24, 2020 | |
| INVENTOR(S) | : Elina A. Vitol | |

It is certified that error appears in the above-identified patent and that said Letters Patent is hereby corrected as shown below:

In the Claims

Column 18, Claim 11, Line 37, after "component" insert -- in --

Signed and Sealed this
First Day of June, 2021

Drew Hirshfeld
*Performing the Functions and Duties of the*
*Under Secretary of Commerce for Intellectual Property and*
*Director of the United States Patent and Trademark Office*